United States Patent [19]

Sekine et al.

[11] Patent Number: 4,968,981
[45] Date of Patent: Nov. 6, 1990

[54] GPS RECEIVER APPARATUS

[75] Inventors: Chogo Sekine; Mutsuo Hada, both of Mitaka, Japan

[73] Assignee: Nihon Musen Kabushiki Kaisha, Tokyo, Japan

[21] Appl. No.: 419,730

[22] Filed: Oct. 11, 1989

[30] Foreign Application Priority Data

Oct. 12, 1988 [JP] Japan .................................. 63-256681

[51] Int. Cl.[5] .............................................. H04B 7/19
[52] U.S. Cl. .................................... 342/356; 342/352; 380/46; 375/1; 375/115
[58] Field of Search ...................... 364/443; 375/115, 1; 380/46; 342/352, 356, 357, 386, 417, 418, 429, 450

[56] References Cited

U.S. PATENT DOCUMENTS

| | | | |
|---|---|---|---|
| 4,203,071 | 5/1980 | Bowles et al. .......................... | 375/1 |
| 4,785,463 | 11/1988 | Janc et al. ................................ | 375/1 |
| 4,809,005 | 2/1989 | Counselman, III .................. | 342/352 |
| 4,821,294 | 4/1989 | Thomas, Jr. ..................... | 342/352 X |

*Primary Examiner*—Thomas H. Tarcza
*Assistant Examiner*—Bernarr Earl Gregory
*Attorney, Agent, or Firm*—Burns, Doane, Swecker & Mathis

[57] ABSTRACT

A GPS receiver apparatus retrieves a maximum correlation point between a PN code involved in a satellite signal and a generated PN code with use of n detecting means each concurrently processing the retrieval operation to acquire the PN code of the satellite signal. The apparatus acquires the PN code of the satellite signal, unless said maximum correlation is yielded, by effecting a correlation processing or taking the synchronization among phases of the PN code in which the generated PN code is shifted in its phase by $n/2$ bits to retrieve the maximum correlation point. The apparatus further tracks GPS radiowaves with the use of a plurality of said detecting means which has been used to acquire the PN code.

3 Claims, 3 Drawing Sheets

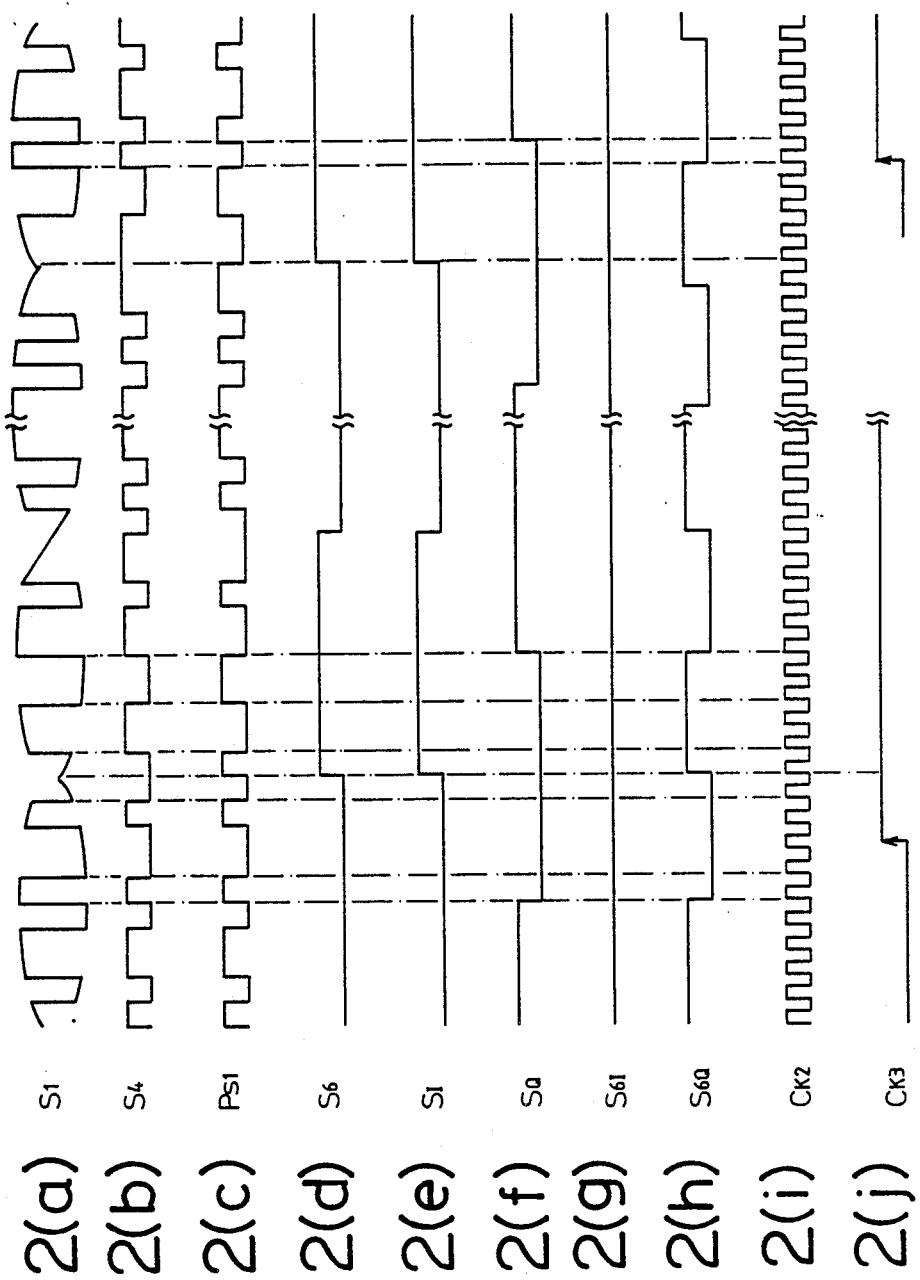

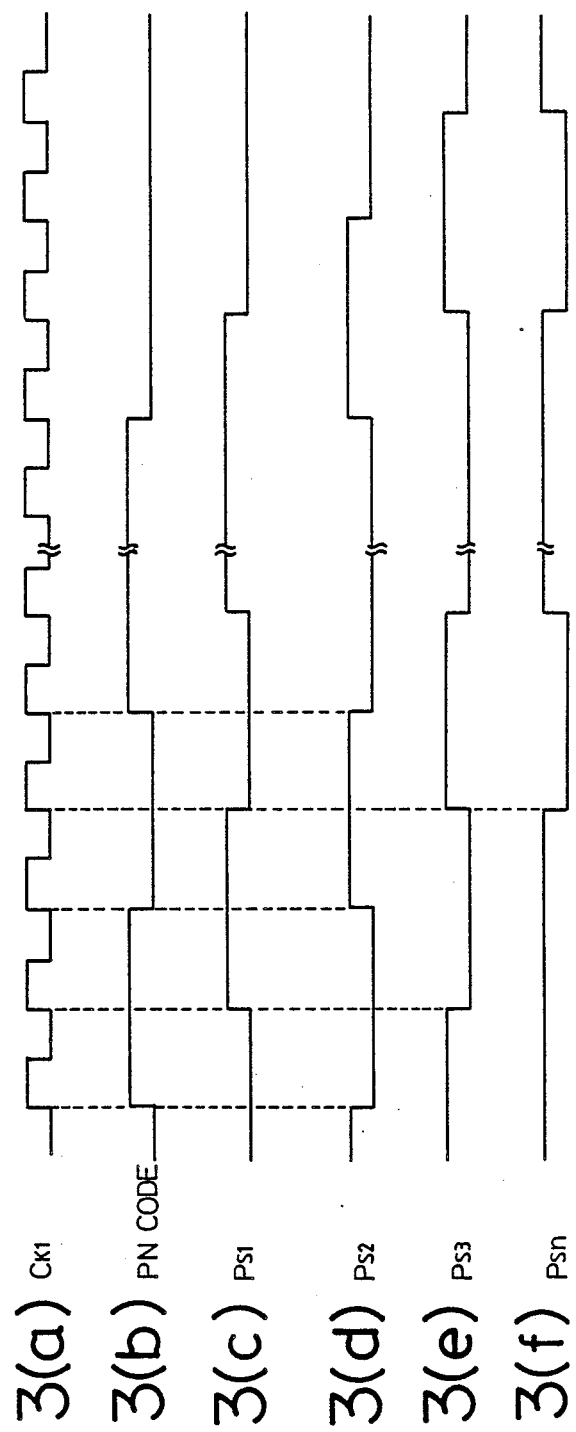

GPS RECEIVER APPARATUS

FIELD OF THE INVENTION

The present invention relates to a GPS (Global Positioning System) receiver apparatus in a global satellite navigation system, and more specifically to a GPS receiver apparatus capable of synchronous acquisition of radiowaves sent from a plurality of GPS satellites (hereinafter referred to as satellites) in a relatively short period of time for shortening the measuring time during which a receiving position is determined.

Passive satellite navigation systems are known which confirm a two-dimensional or three-dimensional position of a mobile body in movement, such as vehicles, ships, aircrafts, and the like, i.e., geographic latitude, longitude, and altitude, or which obtains time information, etc. Presently, a GPS has been employed as such in satellite navigation systems. The GPS receives GPS radiowaves (hereinafter referred to as radiowaves) sent from a plurality of satellites, and extracts from such received radiowaves a pseudo noise code (hereinafter referred to as a PN code) and 50 bits/sec data, by which a carrier is phase-modulated to determine the receiving position based upon the extracted data. A GPS receiver apparatus incorporated in the GPS effects acquisition by synchronization between the carrier and the PN code on the basis of a signal comprising received radiowaves from 3 to 4 satellites (hereinafter referred to as a satellite signal). The GPS receiver apparatus further effects tracking of the satellites based upon such acquisition, and simultaneously demodulates and decodes the received signal to obtain pieces of information such as orbitals of the satellites. Additionally, the apparatus determines the receiving position of the radiowaves and the time of reception on the basis of a pseudo-distance between a measured satellite and the receiving position.

For acquiring and tracking the carrier from the satellite signal as described above, there is provided means for estimating a carrier frequency of the satellite signal in order to undertake acquisition and tracking in a shorter period of time with due consideration of the frequency shifting of the carrier due to a Doppler effect caused by a relative velocity difference between the GPS receiver apparatus and the satellite on the basis of inherent orbital information of each satellite.

In contrast, for acquiring the PN code, the same PN code as that involved in the satellite signal is first generated. Then, a correlation processing is executed between the generated PN code and that involved in the satellite signal such that a maximum correlation point on the time axis between both PN codes is retrieved or phases of both codes are synchronized. More specifically, for acquiring the PN code of the satellite signal, the phase of the PN code generated in the GPS receiver apparatus is shifted for each predetermined time interval with respect to the phase of the PN code of the satellite signal for the correlation processing, and is continued until the maximum correlation is achieved or until the PN code of the satellite signal is acquired.

Such a prior GPS receiver apparatus, which incorporates such an acquisition means for the PN code, however has a drawback in that it requires a relatively long time interval to acquire the PN code and hence a relatively long time interval to measure the receiving position. It is therefore difficult to rapidly and accurately obtain positional information of a mobile body such as vehicles, ships, aircrafts, etc., using the GPS.

SUMMARY OF THE INVENTION

In view of the drawbacks of the prior techniques, it is a general object of the present invention to provide a GPS receiver apparatus capable of being incorporated in mobile bodies such as vehicles, ships, aircrafts, etc., to obtain positional information such as latitude, longitude, and altitude of the mobile.

Another object of the present invention is to provide a GPS receiver apparatus having a reduced circuit scale, thus contributing to its further miniaturization.

Still another object of the present invention is to provide a GPS receiver apparatus capable of acquiring the PN code involved in the satellite signal in a relatively short period of time in order to track the radiowaves from a satellite and determine a position where the radiowaves are received by the apparatus, such apparatus employing the simultaneous use of a plurality (n) of detector means which concurrently process acquisition retrieval of the PN code involved in the satellite signal by retrieving a maximum correlation point between the PN code of the satellite signal and the generated PN code using n detector means, and acquiring the PN code of the satellite signal by effecting a correlation processing if said maximum correlation point is not retrieved, in which processing a maximum correlation point is retrieved by shifting the phase of the generated PN code n/2 bits at a time or the synchronization of the phases of both PN codes is undertaken, and further tracking the radiowaves from the satellite by further using a plurality of detector means which have been employed to acquire the PN code.

Yet still another object of the present invention is to provide a GPS receiver apparatus which receives radiowaves sent from a plurality of GPS satellites and measures a position where the radiowaves from the satellites are received by the apparatus and the time of the reception, and which comprises;

(a) analog-to-binary converting means for converting to a binary signal an analog signal delivered from a radio frequency signal processing means which has received the GPS radiowaves;

(b) PN code generator means for generating the same PN code as that inherent to radiowaves from any GPS satellite among the plurality of the GPS satellites;

(c) shift register means for converting the PN code generated in said PN code generator means to n PN codes each shifted in their phases by ½ bit, and substantially simultaneously delivering those phase-shifted n PN codes;

(d) signal generator means for generating a first signal of a predetermined frequency and a second signal shifted in its phase by 90° from the first signal;

(e) detecting means composed of detectors for receiving the PN codes shifted in their phases by ½ bit corresponding to said n detectors, each detector including a phase comparator for receiving a binary signal from said analog-to-binary converting means and an output signal from said shift register to detect the PN code involved in the radiowaves sent from the GPS satellite, a phase comparator receiver for receiving a signal fed from said phase comparator and the first and second signals delivered from said signal generator means, and a counter for integrating a signal delivered from said phase comparator receiver; and (f) control means for receiving a signal delivered from said detecting means to deliver a control signal for acquiring the GPS satellite signal.

Yet another object of the present invention is to provide a GPS receiver apparatus which determines a receiving position where the radiowaves from the GPS satellite are received by the apparatus, and determines the time thereof by tracking the signal from the GPS satellite with use of a plurality of detectors from among said n detectors after acquiring the radiowaves from the GPS satellite.

Yet still another object of the present invention is to provide a GPS receiver apparatus in which said radio frequency processing means for receiving the GPS radiowaves includes a preamplifier for amplifying the GPS radiowaves received by an antenna.

The above and other objects, features and advantages of the present invention will become more apparent from the following description when taken in conjunction with the accompanying drawings in which a preferred embodiment of the present invention is shown by way of illustrative example.

BRIEF DESCRIPTION OF THE DRAWINGS

FIGS. 2(a)-2(f) and 3(a)-3(f) are timing charts of waveforms at respective portions of the embodiment of FIG. 1, for describing the operation of the same.

DETAILED DESCRIPTION OF THE PREFERRED EMBODIMENT

Figure 1:
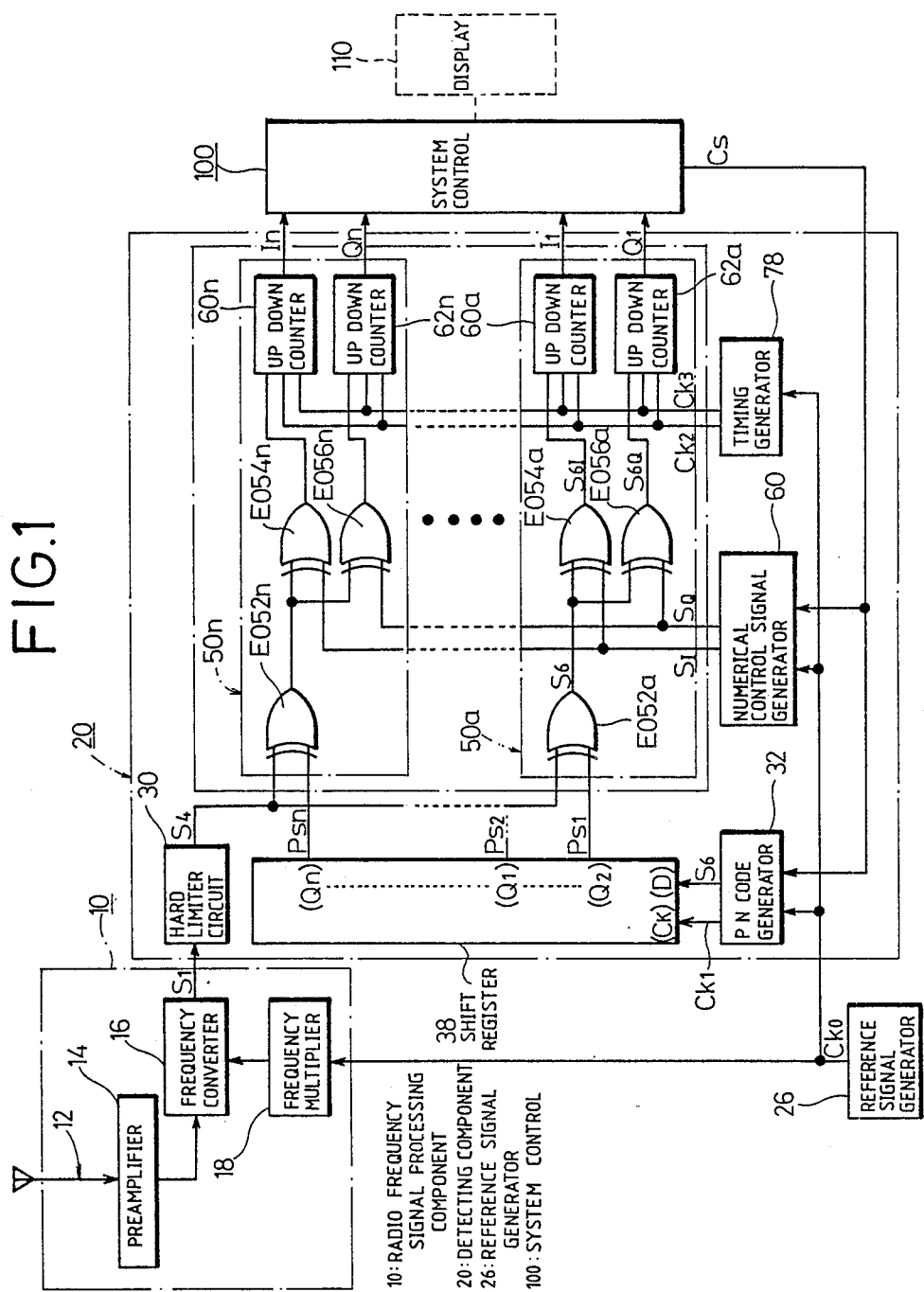
FIG. 1 is a circuit block diagram illustrating a preferred embodiment of a GPS receiver apparatus according to the present invention.

A GPS receiver apparatus in accordance with the present invention includes a radio frequency signal processing component 10 for receiving and amplifying radiowaves sent from a satellite into a predetermined level signal and subjecting the signal to frequency conversion to deliver an intermediate frequency band signal, and a detecting component 20 for effecting the retrieval to acquire the PN code as well as signal processing for tracking the radiowaves sent from a satellite based upon the intermediate frequency band signal delivered from the radio wave signal processing component 10. It further includes a reference signal generator 26 for generating and delivering a carrier standard signal or a clock signal $C_{K0}$ to the respective portions of the apparatus, a system control 100 for controlling the detecting component 20, and a display 110 for visually confirming measured data and the like.

The radio frequency signal processing component 10 includes an antenna 12 for receiving radiowaves sent from a plurality of satellites (not shown), a preamplifier 14 for amplifying a received signal, and a frequency converter 16 which is supplied with a signal amplified by the preamplifier 14. Here in, a frequency multiplier 18 receives an output signal $C_{K0}$ issued from a reference signal generator 26 to multiply by 2 the frequency of the output signal $C_{K0}$ and deliver the signal to the frequency converter 16. The frequency converter 16 mixes the signal amplified by the preamplifier 14 and the signal multiplied in its frequency by the multiplier 18 into an intermediate frequency band signal $S_1$ which is preferably lower than a carrier frequency to ease signal processing thereafter as illustrated in FIG. 2(a). Thus, the intermediate frequency band signal $S_1$ serves as a signal to be modulated which is lower than the carrier frequency (hereinafter referred to as an IF signal) and is converted into a signal phase-modulated by the PN code and 50 bits/sec data.

The detecting component 20 includes a hard limiter circuit 30 for receiving the analog IF signal $S_1$ supplied from the frequency converter 16, and which then converts the IF signal $S_1$ to a digitized signal $S_4$, as illustrated in FIG. 2(b), and outputs the same. It further includes a PN code generator 32, which generates a signal $S_6$ composed of a PN code inherent to the satellite signal, and issues a clock signal $C_{K1}$ at a rate twice that of the PN code and in synchronism with the PN code, as illustrated in FIG. 3(a) through (f). Further a shift register is provided which has an input terminal (D) for receiving the signal $S_6$ and a clock terminal ($C_K$) for receiving the clock signal $CK_1$. In the shift register 38, the signal $S_6$ is shifted in succession by the clock signal $C_{K1}$ and outputted in succession from output terminals $Q_1$ through $Q_n$. Thus, the shift register 38 outputs PN codes $P_{S1}$, $P_{S2}$, ..., $P_{Sn}$ delayed in each phase by ½ bit as the signal goes to later stages. Those PN codes $P_{S1}$, $P_{S2}$, ..., $P_{Sn}$ are fed to detectors 50a through 50n included in the detecting component 20, respectively.

In the following, the construction and operation of the detectors 50a through 50n in the detecting component 20 will be described taking the detector 50a as an example.

In the detector 50a, the digitized signal $S_4$ from the hard limiter circuit 30 and the PN code $P_{S1}$, which is shown in FIG. 2(c) as being coincident with the PN code of the satellite signal are inputted into an exclusive OR gate. The exclusive OR gate EO52a compares the phase of the PN code, which is formed into the digitized signal $S_4$, and the PN code signal $P_{S1}$ and outputs the signal $S_6$ as shown in FIG. 2(d). The signal $S_6$ is fed to exclusive OR gates EO54a and EO56a.

In contrast, a numerical control signal generator (hereinafter, referred to as NC signal generator) 60 generates a frequency signal of the IF signal $S_1$ and two signals $S_I$ and $S_Q$ which are different in the phase by 90° from each other as illustrated in FIG. 2(e) and (f). Those signals $S_I$ and $S_Q$ are fed to exclusive OR gates EO54a and EO56a, respectively. In the exclusive OR gates EO54a and EO56a, phases of the output signal $S_6$ and the signal $S_I$, and phases of the output signal $S_6$ and the signal $S_Q$ are compared, respectively. As a result of this comparison, signals $S_{6I}$ and $S_{6Q}$, as shown in FIGS. 2(g) and (h), are outputted to up-down counters 60a and 62a.

Herein, a timing generator 78 generates clock signals $C_{K2}$ and $C_{K3}$ and supplies those signals to the up-down counters 60a, 62a through 60n, 62n, wherein such pairs of up-down counters are included in each of the n detectors.

The up-down counters 60a, 62a, count up when the signals $S_{6I}$, $S_{6Q}$ are of logic "1" while counting down when those signals are of logic "0", in synchronism with the clock signal $C_{K2}$, which serves as a count clock. The counters 60a, 62a output count signals $I_1$ and $Q_1$, which are accumulated for each period of the clock signal $C_{K3}$, to the system control 100 in synchronism with the clock signal $C_{K3}$. In addition, counted signals $I_2$, $Q_2$ through $I_n$, $Q_n$ from counters 60b, 62b through 60n, 62n (not shown) are fed to the system control 100 for each period of the clock signal $C_{K3}$. These up-down counters 60a, 62a through 60n, 62n are reset after they have delivered the counted signals. The system control 100 evaluates the following:

$$R_1 = |I_1| + |Q_1|$$
$$R_2 = |I_2| + |Q_2|$$
$$\vdots$$
$$R_n = |I_n| + |Q_n|$$

based upon the delivered data from the detectors 50a through 50n, i.e., the counted signals $I_1$, $Q_1$ through $I_n$, $Q_n$.

Herein, when the PN code involved in the digitized signal $S_4$ or that involved in the satellite signal, which is fed into the exclusive OR gates EO52a through EO52n of the detectors 50a through 50n, those gates serving the function of comparing the phases of signals inputted thereinto, is coincident with any of the PN codes $P_{S1}$, $P_{S2}$, ..., $P_{Sn}$ delivered from the shift register 38 in their phases, for example when the former is coincident with the PN code $P_{S1}$ in their phases, the sum of the absolute values of the counted values by the up-down counters 60a, 62a is maximum. Conversely, if a maximum one among the foregoing evaluated values $R_1$, $R_2$, ..., $R_n$ is retrieved, or if there is retrieved or extracted any PN code among the PN codes $P_{S1}$, $P_{S2}$, ..., $P_{Sn}$ which is coincident with the digitized signal $S_4$, the PN code involved in the digitized signal $S_4$ can be acquired.

Additionally, when it is judged on the basis of the foregoing evaluation concerning $R_1$, $R_2$, ..., $R_n$ that there is no PN code among the PN codes $P_{S1}$, $P_{S2}$, ..., $P_{Sn}$ which is coincident with the PN code involved in the digitized signal $S_4$ on the time axis, the PN code $S_6$ issued from the PN code generator 32 is shifted in its phase by n/2 bits to retrieve the PN code involved in the digitized signal $S_4$ too. The sequence of the above operation, such as the selection of the PN code in the PN code generator 32 and the control of the frequencies and phases of the associated signals, etc., is executed by the system control 100. The system control 100 delivers a control signal $C_S$ until the PN code of the satellite signal is acquired.

As described above, the present invention is adapted to employ n detectors simultaneously to retrieve the PN code involved in the satellite signal in a relatively short period of time.

In what follows, an examplary description will be given wherein, for tracking satellite signals from three or four satellites three detectors in the detecting component 20 are employed.

The successive three detectors for use in the tracking of satellite signals are assumed to be detectors (K−1), (K), and (K+1). Those detectors are successively supplied with PN codes $P_S(K-1)$, $P_S(K)$, $P_S(K+1)$ from the shift register 38, and the paired counters of the detectors output counted signals $I_{K-1}$, $Q_{K-1}$, $I_K$, $Q_K$, and $I_{K+1}$, $Q_{K+1}$ successively which are fed in turn to the system control 100. The systemcontrol 100 performs tracking control based upon those input signals. In the tracking conditions of the satellite signals, the system control 100 controls the PN code generator 32 such that the PN code involved in the digitized signal $S_4$ is coincident with $P_S(K)$ on the time axis, and further controls the NC signal generator 60 such that the modulated signal of the digitized signal $S_4$ is coincident with the signal $S_I$ in their frequencies and phases. Hereby, $P_S(K-1)$ and $P_S(K+1)$ are both shifted by ½ bit with respect to the $P_S$ code involved in the digitized signal $S_4$, and the modulated signal of the digitized signal $S_4$ is shifted 90° from $S_Q$.

To maintain such tracking conditions, the system control 100 controls the associated operation such that $|I_K|$ is maximum, $|Q_K|$ is zero, and $|I_{K+1}| - |I_{K-1}|$ is zero.

It is thus possible, as described above to track the satellite signals with the use of three successive detectors in the detecting component 20 and to measure a receiving position of the apparatus by measuring pseudo-distances between the satellites and the apparatus after tracking the satellite signals.

According to the present invention, as described above, for acquiring the PN code involved in the satellite signal, a maximum correlation point between the PN code involved in the satellite signal and the generated PN code is retrieved with use of n detecting means which concurrently process associated signals. Unless the maximum correlation point is retrieved, a correlation processing is applied for retrieving such a maximum correlation point by shifting the generated PN code n/2 bits at a time; or in other words, a processing is effected which synchronizes the phases of the PN code of the satellite signal with any of the generated PN codes shifted as described above. Additionally, radiowaves transmitted from any satellite are tracked using a plurality of detecting means which have been used to acquire the PN code of the satellite signal.

Accordingly, the PN code involved in the radiowaves transmitted from any satellite can be acquired in a relatively short period of time to track the radiowaves and determine a receiving position by the apparatus most rapidly. Further, the apparatus achieves a reduction in its circuit scale.

Generally, in vehicles for example, radiowaves from satellites tend to be blocked by buildings and other obstacles in a city area so that there is a limited time interval during which signals from three to four satellites needed to measure the receiving point can be simultaneously received.

A vehicle, which mounts thereon a GPS receiver apparatus of the present invention, can however measure the receiving position with ease. Additionally, a plurality of the detecting means which originally serve to acquire the PN code, has the additional function of tracking the radiowaves from the satellite, thereby eliminating the need of constructing another processing circuit for measuring the receiving position and hence reducing the circuit scale. Furthermore, by the use of the digital signal processing, the circuit can be constructed in the form of a large scale integrated circuit (LSI) with ease, thereby miniaturizing the apparatus.

What is claimed is:

1. A GPS receiver apparatus for receiving radiowaves from a plurality of GPS satellites and determining a receiving position where said radiowaves are received by the apparatus, and the time thereof, on the basis of pieces of information involved in the received radiowaves, the apparatus comprising:

(a) analog-to-digital converting means for converting to a digital signal an analog signal delivered from a radio frequency signal processing means which has received the GPS radiowaves;

(b) PN code generator means for generating the same PN code as that inherent to radiowaves from any GPS satellite among the plurality of the GPS satellites;

(c) shift register means for converting the PN code generated in said PN generator means to n PN codes each shifted in their phases by ½ bit, and substantially simultaneously delivering those phase-shifted n PN codes;

(d) signal generator means for generating a first signal of a predetermined frequency and a second signal shifted in its phase by 90° from the first signal;

(e) a plurality of first phase comparators each of said first phase comparators having two input terminals, one of which is connected to an output terminal of said shift register means and the other of which is connected to an output terminal of said analog-to-digital converting means, said first phase comparators comparing said outputs from said shift register means and said analog-to-digital converting means;

(f) a plurality of second phase comparators connected to said first phase comparators, respectively for receiving outputs of said first phase comparators, and for receiving said first and second signals from said signal generating means;

(g) a plurality of counters for integrating output signals delivered from said second phase comparators; and, (h) control means for receiving a signal delivered from said plurality of counters and for delivering a control signal for acquiring a GPS satellite signal.

2. A GPS receiver apparatus according to claim 1 wherein said GPS receiver determines a receiving position where the radiowaves from the GPS satellite are received by the apparatus, and determines the time thereof, by tracking the signal from the GPS satellite using specified ones of said plurality of first phase comparators and second phase comparators after acquiring the radiowaves from the GPS satellite.

3. A GPS receiver apparatus according to claim 1 wherein said radio frequency processing means for receiving the GPS radiowaves includes a preamplifier for amplifying the GPS radiowaves received by an antenna.

* * * * *